US012792210B2

(12) United States Patent
Guo

(10) Patent No.: US 12,792,210 B2
(45) Date of Patent: Nov. 10, 2026

(54) DATA ACCESS OF DISTRIBUTED GRAPH LEARNING ARCHITECTURE

(71) Applicant: Alipay (Hangzhou) Information Technology Co., Ltd., Hangzhou (CN)

(72) Inventor: Zhiqiang Guo, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 512 days.

(21) Appl. No.: 18/571,944

(22) PCT Filed: Jul. 26, 2022

(86) PCT No.: PCT/CN2022/107761
§ 371 (c)(1),
(2) Date: Dec. 19, 2023

(87) PCT Pub. No.: WO2023/040468
PCT Pub. Date: Mar. 23, 2023

(65) Prior Publication Data

US 2024/0289015 A1 Aug. 29, 2024

(30) Foreign Application Priority Data

Sep. 17, 2021 (CN) ......................... 202111091203.2

(51) Int. Cl.
*G06F 3/06* (2006.01)
*G06F 16/901* (2019.01)

(52) U.S. Cl.
CPC .......... *G06F 3/0608* (2013.01); *G06F 3/0644* (2013.01); *G06F 3/0656* (2013.01); *G06F 3/0683* (2013.01); *G06F 16/9024* (2019.01)

(58) Field of Classification Search
CPC .... G06F 3/0608; G06F 3/0644; G06F 3/0656; G06F 3/0683; G06F 16/9024;
(Continued)

(56) References Cited

U.S. PATENT DOCUMENTS

2004/0215883 A1 10/2004 Bamford et al.
2016/0103845 A1 4/2016 Yeddanapudi et al.

FOREIGN PATENT DOCUMENTS

CN 103493029 A 1/2014
CN 110795221 A 2/2020
(Continued)

OTHER PUBLICATIONS

AliGraph: A Comprehensive Graph Neural Network Platform (Year: 2019).*
(Continued)

*Primary Examiner* — Mohamed Abou El Seoud

(57) ABSTRACT

In a data access method, graph nodes in the first graph learning device are grouped into a plurality of graph node groups with a priority. A priority of the graph node group is determined based on a graph node dependency relationship, and the graph node dependency relationship is used to reflect dependency of the graph node relative to the mirror node during graph learning. A mirror node on which each graph node group depends is determined based on the graph node dependency relationship; and cache space is allocated, from a common buffer of the first graph learning device based on the priority of the graph node group, to the mirror node on which each graph node group depends.

15 Claims, 9 Drawing Sheets

(58) Field of Classification Search
CPC ...... G06F 12/0875; G06F 3/061; G06F 3/067; G06N 20/00
See application file for complete search history.

(56) References Cited

FOREIGN PATENT DOCUMENTS

| | | | |
|---|---|---|---|
| CN | 111191080 | A | 5/2020 |
| CN | 113568586 | A | 10/2021 |
| CN | 114217743 | A | 3/2022 |

OTHER PUBLICATIONS

GraphTheta: A Distributed Graph Neural Network Learning System With Flexible Training Strategy (Year: 2021).*
PaGraph: Scaling GNN Training on Large Graphs via Computation-aware Caching (Year: 2020).*
Ding, "Performance Optimization of Distributed Graph Computation Framework Based on BSP Model," Information & Technology, China Master's These, Jan. 15, 2016.
International Search Report and Written Opinion for PCT application No. PCT/CN2022/107761, mailed Oct. 26, 2022.

* cited by examiner

| | B' | C' | D' | H' |
|---|---|---|---|---|
| A | 0 | 0 | 0 | 0 |
| B | 0 | 0 | 0 | 0 |
| C | 0 | 0 | 0 | 0 |
| D | 0 | 0 | 0 | 0 |
| E | 1 | 0 | 0 | 0 |
| F | 0 | 0 | 1 | 1 |
| G | 1 | 1 | 0 | 0 |
| H | 0 | 0 | 0 | 0 |
| I | 0 | 0 | 1 | 1 |

DATA ACCESS OF DISTRIBUTED GRAPH LEARNING ARCHITECTURE

CROSS-RELATED APPLICATIONS

This specification is a U.S. National Stage Application of PCT Application Serial No. PCT/CN2022/107761, filed Jul. 26, 2022, which claims priority to Chinese Patent Application No. 202111091203.2, filed with the China National Intellectual Property Administration on Sep. 17, 2021, and entitled "DATA ACCESS OF DISTRIBUTED GRAPH LEARNING ARCHITECTURE", which are incorporated herein by reference in their entireties.

TECHNICAL FIELD

Embodiments of this specification usually relate to the graph data processing field, and in particular, to a data access method and a data access apparatus that are applied to a distributed graph learning architecture.

BACKGROUND

In a graph learning architecture, if a used graph node is a hyperscale graph node, the graph learning architecture needs to be deployed as a distributed graph learning architecture, and graph nodes are distributed in all distributed graph learning devices in the graph learning architecture based on a graph partitioning algorithm. When the graph nodes are distributed in all the distributed graph learning devices, a critical node exists in the distributed graph nodes. Some neighboring nodes of the critical node are stored in a graph learning device in which the critical node is located, and the other neighboring nodes of the critical node are stored in another graph learning device.

During graph learning, the graph learning device in which the critical node is located needs to store node data of the critical node, and the node data of the critical node needs to be mapped onto the graph learning device in which the other neighboring nodes of the critical node are located. In other words, the graph learning device in which the other neighboring nodes of the critical node are located needs to store mapping information of the node data of the critical node. The graph node stored in the graph learning device can be referred to as a master node, node data of the master node can be referred to as master data, and node data of a graph node mapped onto another graph learning device can be referred to as mirror data (mirror data) of the graph node. In this case, the graph node mapped onto the another graph learning device can also be referred to as a mirror node (mirror node).

In the above-mentioned graph node data access manner, when data updating is performed on the master data of the master node, all mirror data distributed in the another graph learning device needs to be updated synchronously, to ensure data consistency between the master node and the mirror node. In such a processing manner, a complete backup of the master data needs to be stored in a memory of a graph learning device in which each mirror node is located, thereby wasting memory space of the graph learning device.

SUMMARY

In view of the above-mentioned descriptions, embodiments of this specification provide a data access method and a data access apparatus that are applied to a distributed graph learning architecture. In such a data access solution, a common buffer is set in a graph learning device with a mirror node, and is configured to cache node data of a mirror node that needs to be used during graph learning. When mirror data used for graph learning is accessed, node grouping is performed on a graph node in the graph learning device, a plurality of obtained graph node groups have a priority when the mirror data is accessed, and a priority of each graph node group is determined based on a graph node dependency relationship. Cache space is allocated, from the common buffer of the graph learning device based on the priority of the graph node group, to a mirror node on which each graph node group depends. Then, a data access process is initiated, for a graph node for which cache space allocation is completed, to a graph learning device in which a corresponding graph node of the mirror node on which the graph node depends is located; and obtained graph node data is cached in the allocated cache space.

Based on the data access solution, graph nodes are grouped into graph node groups with an access priority determined based on the graph node dependency relationship, and cache space is allocated to each graph node group from a specified common buffer based on the access priority. Only after cache space allocation is completed for a graph node, a data access process is initiated to another graph learning device. Stored mirror node data is cached in the allocated cache space for graph learning. Therefore, a complete backup of master data does not need to be stored in the graph learning device in which each mirror node is located, to improve utilization of storage space of the graph learning device.

According to one aspect of the embodiments of this specification, a data access method applied to a distributed graph learning architecture is provided. The data access method is performed by a first graph learning device that has a mirror node in the distributed graph learning architecture, and the data access method includes: performing node grouping on a graph node in the first graph learning device, to obtain a plurality of graph node groups with a priority, where a priority of the graph node group is determined based on a graph node dependency relationship, and the graph node dependency relationship is used to reflect dependency of the graph node relative to the mirror node during graph learning; determining, based on the graph node dependency relationship, a mirror node on which each graph node group depends; allocating, from a common buffer of the first graph learning device based on the priority of the graph node group, cache space to the mirror node on which each graph node group depends; initiating, for a graph node for which cache space allocation is completed, a data access process to a second graph learning device in which a corresponding graph node of the mirror node on which the graph node depends is located; and caching, in the allocated cache space, graph node data returned in response to the data access process.

Optionally, in an example of the aspect, the performing node grouping on a graph node in the first graph learning device, to obtain a plurality of graph node groups with a priority can include: ranking the graph node in the first graph learning device based on the graph node dependency relationship; and performing node grouping on the graph node in the first graph learning device based on a graph node ranking result, to obtain the plurality of graph node groups with a priority.

Optionally, in an example of the aspect, the initiating, for a graph node for which cache space allocation is completed, a data access process to a second graph learning device in which a corresponding graph node of the mirror node on which the graph node depends is located can include: initiating, for a graph node group for which cache space allocation is completed, a data access process to a second graph learning device in which a corresponding graph node of a mirror node on which the graph node group depends is located.

Optionally, in an example of the aspect, the graph node dependency relationship is generated when graph partitioning is performed on graph node data of the distributed graph learning architecture.

Optionally, in an example of the aspect, each graph node group has a configurable group size.

Optionally, in an example of the aspect, when node grouping is performed on the graph node in the first graph learning device based on the graph node ranking result, if at least two graph nodes that depend on the same mirror node can be grouped into the same graph node group, the at least two graph nodes are grouped into the same graph node group.

Optionally, in an example of the aspect, the ranking the graph node in the first graph learning device based on the graph node dependency relationship includes: determining, based on the graph node dependency relationship, a node quantity of mirror nodes on which each graph node in the first graph learning device depends; and ranking the graph node in the first graph learning device based on the node quantity of mirror nodes on which each graph node depends.

Optionally, in an example of the aspect, graph nodes that have the same node quantity of mirror nodes have the same ranking; and when node grouping is performed on the graph node in the first graph learning device based on the graph node ranking result, for graph nodes having the same ranking, determining a group priority of the graph node based on a quantity of mirror nodes that are in mirror nodes on which the graph node depends and that belong to a graph node group obtained through grouping.

Optionally, in an example of the aspect, the allocating, from a common buffer of the first graph learning device based on the priority of the graph node group, cache space to the mirror node on which each graph node group depends can include: for each graph node group, checking whether cache space is allocated to a mirror node on which the graph node group depends; and for a mirror node to which no cache space is allocated, allocating cache space to the mirror node from the common buffer of the first graph learning device.

Optionally, in an example of the aspect, the initiating, for a graph node group for which cache space allocation is completed, a data access process to a second graph learning device in which a corresponding graph node of a mirror node on which the graph node group depends is located can include: for a graph node group for which cache space allocation is completed, checking whether cache space of each mirror node on which the graph node group depends caches graph node data; and for a mirror node that caches no graph node data, initiating a data access process to a second graph learning device in which a corresponding graph node of the mirror node is located.

Optionally, in an example of the aspect, the data access method can further include: in response to that the first graph learning device completes graph learning training of each graph node in a graph node group, releasing cache space allocated to all mirror nodes on which the graph node group depends.

Optionally, in an example of the aspect, the data access method can further include: in response to that the first graph learning device completes graph learning training of each graph node in a graph node group, determining, based on the graph node dependency relationship, whether a dependency-free mirror node exists in a mirror node on which the graph node group depends, where the dependency-free mirror node includes a mirror node on which a graph node group whose graph learning process is not completed does not depend; and when a dependency-free mirror node exists in the mirror node on which the graph node group depends, releasing cache space allocated to the dependency-free mirror node.

Optionally, in an example of the aspect, a graph learning process of the distributed graph learning architecture is a hierarchical iterative learning process, and a cache space allocation step of the mirror node, an initiation step of the data access process, and a caching step of the graph node data are cyclically performed until the hierarchical iterative learning process is completed.

According to another aspect of the embodiments of this specification, a data access apparatus applied to a distributed graph learning architecture is provided. The data access apparatus is applied to a first graph learning device that has a mirror node in the distributed graph learning architecture, and the data access apparatus includes: a node grouping unit, configured to perform node grouping on a graph node in the first graph learning device, to obtain a plurality of graph node groups with a priority, where a priority of the graph node group is determined based on a graph node dependency relationship, and the graph node dependency relationship is used to reflect dependency of the graph node relative to the mirror node during graph learning; a mirror node determining unit, configured to determine, based on the graph node dependency relationship, a mirror node on which each graph node group depends; a cache space allocation unit, configured to allocate, from a common buffer of the first graph learning device based on the priority of the graph node group, cache space to the mirror node on which each graph node group depends; a data access unit, configured to initiate, for a graph node for which cache space allocation is completed, a data access process to a second graph learning device in which a corresponding graph node of the mirror node on which the graph node depends is located; and a data cache unit, configured to cache, in the allocated cache space, graph node data returned in response to the data access process.

Optionally, in an example of the aspect, the data access apparatus can further include: a graph node ranking unit, configured to rank the graph node in the first graph learning device based on the graph node dependency relationship. The node grouping unit performs node grouping on the graph node in the first graph learning device based on a graph node ranking result of the graph node ranking unit, to obtain the plurality of graph node groups with a priority.

Optionally, in an example of the aspect, the data access unit initiates, for a graph node group for which cache space allocation is completed, a data access process to a second graph learning device in which a corresponding graph node of a mirror node on which the graph node group depends is located.

Optionally, in an example of the aspect, the data access apparatus can further include: a dependency relationship storage unit, configured to store a graph node dependency relationship generated when graph partitioning is performed on graph node data of the distributed graph learning architecture.

Optionally, in an example of the aspect, when node grouping is performed on the graph node in the first graph learning device based on the graph node ranking result, if at least two graph nodes that depend on the same mirror node can be grouped into the same graph node group, the node grouping unit groups the at least two graph nodes into the same graph node group.

Optionally, in an example of the aspect, the graph node ranking unit can include: a mirror node quantity determining module, configured to determine, based on the graph node dependency relationship, a node quantity of mirror nodes on which each graph node in the first graph learning device depends; and a graph node ranking module, configured to rank the graph node in the first graph learning device based on the node quantity of mirror nodes on which each graph node depends.

Optionally, in an example of the aspect, graph nodes that have the same node quantity of mirror nodes have the same ranking; and when node grouping is performed on the graph node in the first graph learning device based on the graph node ranking result, for graph nodes having the same ranking, the node grouping unit determines a group priority of the graph node based on a quantity of mirror nodes that are in mirror nodes on which the graph node depends and that belong to a graph node group obtained through grouping, and performs node grouping based on the group priority of the graph node.

Optionally, in an example of the aspect, the cache space allocation unit can include: a cache space allocation check module, configured to: for each graph node group, check whether cache space is allocated to a mirror node on which the graph node group depends; and a cache space allocation module, configured to: for a mirror node to which no cache space is allocated, allocate cache space to the mirror node from the common buffer of the first graph learning device.

Optionally, in an example of the aspect, the data access unit can include: a data cache check module, configured to check whether cache space of each mirror node on which the graph node group depends caches graph node data; and a data access module, configured to: for a mirror node that caches no graph node data, initiate a data access process to a second graph learning device in which a corresponding graph node of the mirror node is located.

Optionally, in an example of the aspect, the data access apparatus can further include: a cache space releasing unit, configured to: in response to that the first graph learning device completes graph learning training of each graph node in a graph node group, release cache space allocated to all mirror nodes on which the graph node group depends.

Optionally, in an example of the aspect, the data access apparatus can further include: a dependency-free mirror node check unit, configured to: in response to that the first graph learning device completes graph learning training of each graph node in a graph node group, determine, based on the graph node dependency relationship, whether a dependency-free mirror node exists in a mirror node on which the graph node group depends, where the dependency-free mirror node includes a mirror node on which a graph node group whose graph learning process is not completed does not depend; and a cache space releasing unit, configured to: when a dependency-free mirror node exists in the mirror node on which the graph node group depends, release cache space allocated to the dependency-free mirror node.

According to another aspect of the embodiments of this specification, a data access apparatus applied to a distributed graph learning architecture is provided, including: at least one processor; a storage coupled to the at least one processor; and a computer program stored in the storage. The at least one processor executes the computer program, to implement the data access method applied to a distributed graph learning architecture.

According to another aspect of the embodiments of this specification, a computer-readable storage medium is provided. The computer-readable storage medium stores executable instructions, and when the instructions are executed, a processor is enabled to perform the data access method applied to a distributed graph learning architecture.

According to another aspect of the embodiments of this specification, a computer program product is provided, including a computer program. The computer program is executed by a processor, to implement the data access method applied to a distributed graph learning architecture.

DESCRIPTION OF EMBODIMENTS

Figure 1:
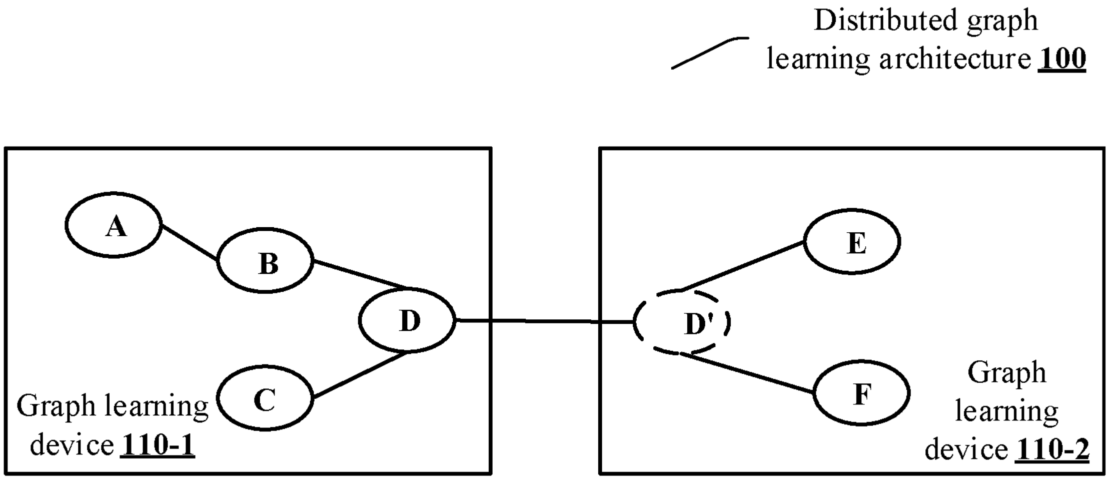
FIG. 1 is an example schematic diagram illustrating a distributed graph learning architecture.

The subject matter described in this specification is discussed now with reference to example implementations. It should be understood that these implementations are merely discussed to enable a person skilled in the art to better understand and implement the subject matter described in this specification, and are not intended to limit the protection scope, applicability, or examples described in the claims. The functions and arrangements of the elements under discussion can be changed without departing from the protection scope of the content of this specification. Various processes or components can be omitted, replaced, or added in the examples based on needs. For example, the described method can be performed in a sequence different from the described sequence, and steps can be added, omitted, or combined. In addition, features described for some examples can also be combined in other examples. Features can also be combined in other examples.

As used in this specification, the term “include” and variant thereof represent open terms, meaning “including but not limited to”. The term “based on” means “at least partially based on”. The terms “one embodiment” and “an embodiment” represent “at least one embodiment”. The term “another embodiment” means “at least one other embodiment”. The terms “first”, “second”, etc. can refer to different objects or the same object. Other definitions, whether explicit or implicit, can be included below. Unless expressly stated in the context, the definition of one term is consistent throughout this specification.

A graph learning architecture is an architecture in which graph learning is performed based on graph node data. In this specification, graph learning can include, for example, graph learning model training performed based on graph node data. The graph node data includes a graph node and edge data. The graph node includes node attribute data, and the edge data includes edge attribute data. The node attribute data and the edge attribute data can be related to a service. For example, in a social network scenario, the node attribute data can include an age, an education, an address, an occupation, etc. The edge attribute data can include a relationship between nodes, that is, a relationship between persons, for example, a classmate/colleague relationship.

In the graph learning architecture, if a used graph node is a hyperscale graph node, a graph learning architecture needs to be deployed as a distributed graph learning architecture, and graph node data is distributed to each distributed graph learning device in the graph learning architecture based on a graph partitioning algorithm. After graph nodes are distributed to each distributed graph learning device, for a critical node, a master node of the critical node needs to be stored in a graph learning device in which the critical node is located, and a mirror node of the critical node is created in another graph learning device in which another neighboring node of the critical node is located.

FIG. 1 is an example schematic diagram illustrating a distributed graph learning architecture 100. In the example in FIG. 1, two graph learning devices 110-1 and 110-2 are shown. In another embodiment, the distributed graph learning architecture 100 can include at least two graph learning devices. In this specification, an example of the graph learning device can include but is not limited to various graph learning processing devices such as a GPU device and a CPU device.

As shown in FIG. 1, after graph partitioning is performed on a graph node of the distributed graph learning architecture 100, the graph learning device 110-1 has graph nodes A, B, C, and D, and the graph learning device 110-2 has graph nodes E and F. In addition, the graph learning device 110-2 further has a mirror node (mirror node) D' of the graph node D. In this specification, real graph nodes A, B, C, D, E, and F of the distributed graph learning architecture 100 can be referred to as master nodes, and the created mirror node D' may be referred to as mirror nodes. In the example in FIG. 1, there is a neighboring node relationship between the graph node B and graph nodes A and D, and there is a neighboring node relationship between the graph node D and graph nodes B, C, E and F.

Figure 2:
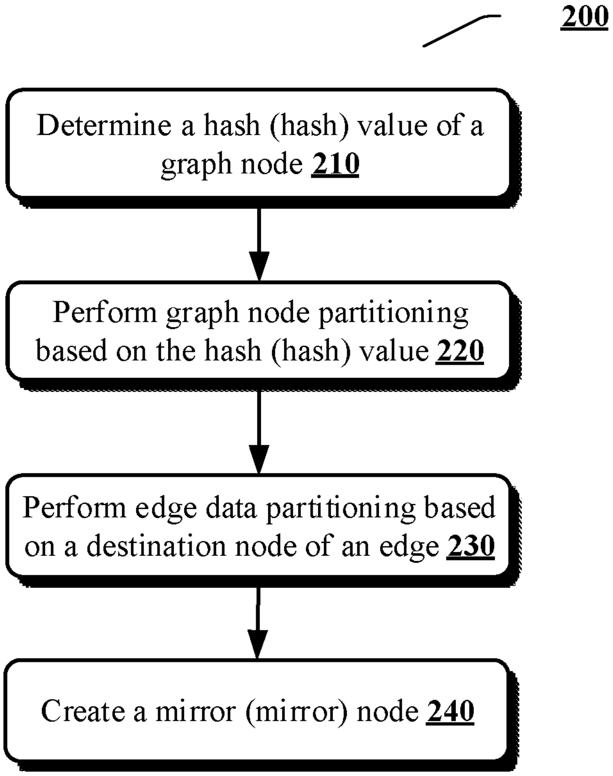
FIG. 2 is an example flowchart illustrating a graph node partitioning process.

FIG. 2 is an example flowchart illustrating a graph node partitioning process 200.

As shown in FIG. 2, in 210, a hash (HASH) value of each graph node of a distributed graph learning architecture is determined. For example, the hash value can be determined by performing hash calculation on some or all graph node data of the graph node. For example, the graph node data of the graph node can include a node ID of the graph node, node attribute data of the graph node, and/or edge attribute data. For example, the hash value can be determined by performing hash calculation based on the node ID of the graph node.

In 220, graph node partitioning is performed based on the determined hash value of each graph node. For example, as shown in FIG. 1, assuming that hash values of a graph node A, a graph node B, a graph node C, and a graph node D are 1, the graph node A, the graph node B, the graph node C, and the graph node D are distributed to a graph learning device 110-1 through partitioning; and if hash values of a graph node E and a graph node F are 2, the graph node E and the graph node F are distributed to a graph learning device 110-2 through partitioning.

In 230, after graph node partitioning is completed, edge data partitioning is performed based on a destination node of each edge. For example, because a destination node of an edge AB is the graph node B, and the graph node B is distributed to the graph learning device 110-1 through partitioning, the edge AB is distributed to the graph learning device 110-1 through partitioning. In addition, because a start node A of the edge AB is also in the graph learning device 110-1, the edge AB does not have a critical problem. Because a destination node of an edge DE is the graph node E, and the graph node E is in the graph learning device 110-2, the edge DE is distributed to the graph learning device 110-2 through partitioning. In addition, because a start node D of the edge DE is distributed to the graph learning device 110-1, the edge DE has a critical problem.

In 230, after edge data partitioning is completed as described above, for an edge with a critical problem, a mirror node needs to be created, for a start node of the edge, in a graph learning device in which a destination node of the edge with a critical problem is located. For example, for the edge DE with a critical problem, a mirror node D' is created for the graph node D in the graph learning device 110-2.

Figure 3:
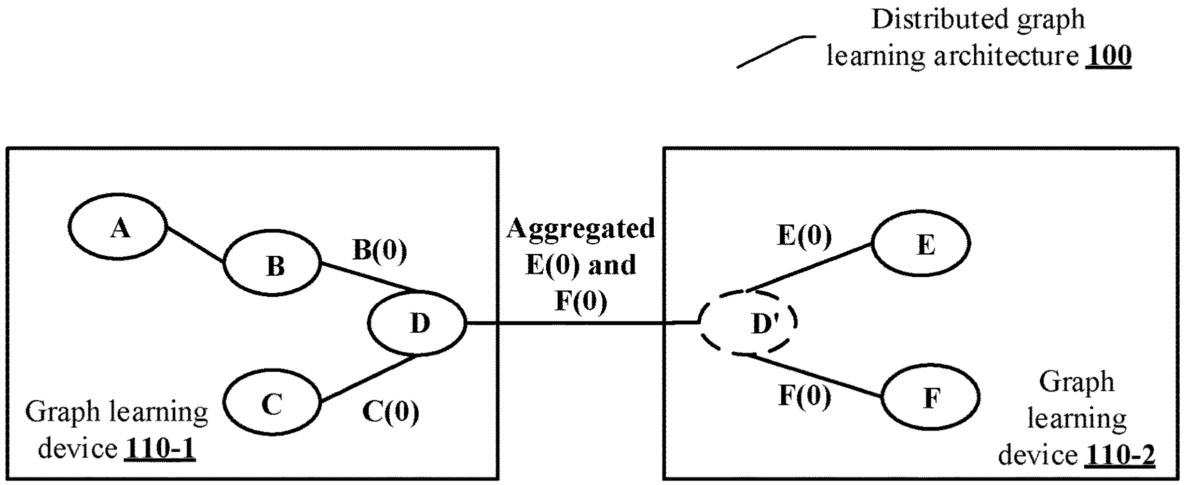
FIG. 3 is an example schematic diagram illustrating a graph learning process.

A graph learning process is usually a gather-apply-scatter layering process, and a quantity of layers represents a depth of a graph learning model. The following describes, by using a two-layer graph learning model as an example, a graph learning training process of the distributed graph learning architecture shown in FIG. 1. Here, a quantity of layers of the graph learning model can also be referred to as a model depth of the graph learning model. In other words, a node can affect a quantity of hops of neighboring nodes. FIG. 3 is an example schematic diagram illustrating a graph learning process. FIG. 3 shows only a graph learning process at the first layer.

It is assumed that initial values of the graph nodes A, B, C, D, E, and F are respectively A(0), B(0), C(0), D(0), E(0), and F(0). At the first layer, in the graph learning device 110-2, the values E(0) and F(0) of the graph nodes E and F are aggregated to the mirror node D'. Then, an aggregation value of the mirror node D' is aggregated to a corresponding graph node D of the mirror node D'. In this specification, an aggregation operation can be a concat (concatenation), or can be another neural network operation such as add or pooling. In the graph learning device 110-1, the values B(0) and C(0) of the graph nodes B and C are aggregated to the graph node D. Then, aggregation values (that is, aggregation values of B(0) and C(0) and aggregation values of E(0) and F(0)) obtained by the graph node D and D(0) of the graph node D are aggregated to obtain D(1), and obtained D(1) represents data of the graph node D at the second layer. Calculation is performed for remaining graph nodes B in the same manner, to obtain A(1), B(1), C(1), E(1), and F(1).

At the second layer, in the above-mentioned manner, the graph node D aggregates the values B(1), C(1), E(1), and F(1) of neighboring nodes B, C, E, and F, and then aggregates an aggregation value with D(0) of the graph node D, to obtain data D(2) of the graph node D at the third layer. During layer 2 training, the mirror node D' is a neighboring node of the graph nodes E and F. Therefore, when aggregation calculation of the graph nodes E and F is performed, D(1) needs to be sent from the graph node D to the mirror node D'.

In a conventional graph node data access manner, when data updating is performed on master data of a master node, if the master node has a corresponding mirror node, mirror data of a corresponding mirror node distributed in another graph learning device needs to be updated synchronously, to ensure data consistency between the master node and the mirror node of the master node. In such a processing manner, a complete backup of the master data needs to be stored in a graph learning device in which each mirror node is located, thereby causing a waste of storage space of the graph learning device.

In view of the above-mentioned descriptions, an embodiment of this specification provides a data access solution. In the data access solution, a common buffer is set in a graph learning device with a mirror node, and is configured to cache mirror data that is of a mirror node and that needs to be used for graph learning. When the mirror data used for graph learning is accessed, node grouping is performed on a graph node in the graph learning device, and when mirror data is accessed, a plurality of obtained graph node groups have a priority determined based on a graph node dependency relationship. Cache space is allocated, from the common buffer of the graph learning device based on the priority of the graph node group, to a mirror node on which each graph node group depends. Then, a data access process is initiated, for a graph node for which cache space allocation is completed, to a graph learning device in which a corresponding graph node of the mirror node on which the graph node depends is located; and obtained graph node data is cached in the allocated cache space.

Based on the data access solution, graph nodes are grouped into graph node groups with an access priority determined based on the graph node dependency relationship, and cache space is allocated to each graph node group from a specified common buffer based on the access priority. In addition, after cache space allocation is completed for a graph node, a data access process is initiated to another graph learning device. Stored mirror node data is cached in the allocated cache space for graph learning. Therefore, a complete backup of master data does not need to be permanently stored in storage space (memory) of the graph learning device in which each mirror node is located, to improve utilization of storage space of the graph learning device.

Figure 4:
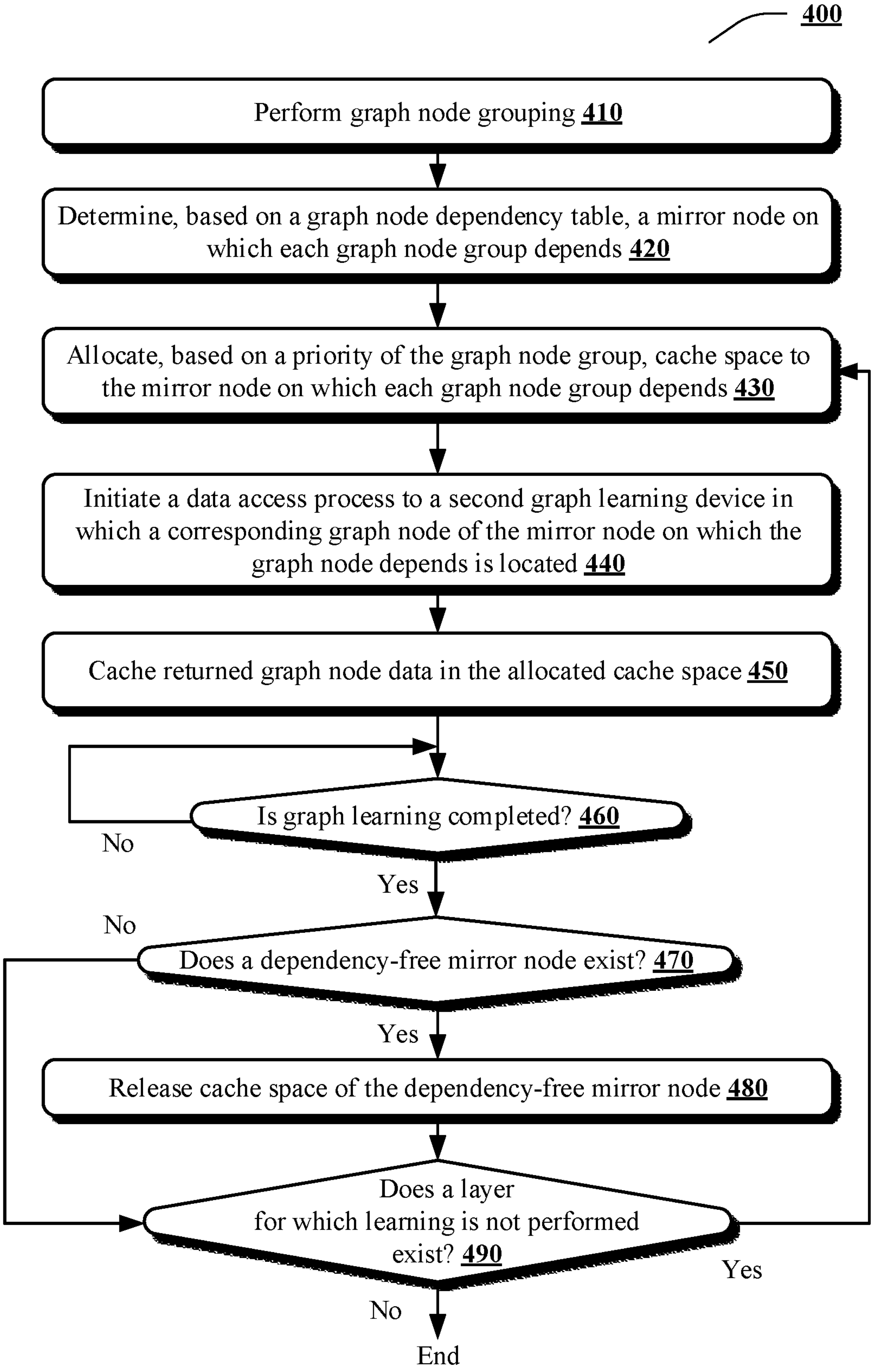
FIG. 4 is an example flowchart illustrating a data access method applied to a distributed graph learning architecture, according to an embodiment of this specification.

FIG. 4 is an example flowchart illustrating a data access method 400 applied to a distributed graph learning architecture, according to an embodiment of this specification. The data access method 400 shown in FIG. 4 is performed by a first graph learning device with a mirror node in a distributed graph learning architecture. Relative to the first graph learning device, a remaining graph learning device in the distributed graph learning architecture is referred to as second graph learning device.

As shown in FIG. 4, in 410, node grouping is performed on the graph node in the first graph learning device, to obtain a plurality of graph node groups with a priority. A priority of each graph node group is determined based on a graph node dependency relationship. In this specification, the priority can be used to indicate a cache space allocation priority of the graph node group, or can be used to indicate a data access priority of the graph node group. A higher priority of a graph node group indicates an earlier time point of allocating cache space to or accessing graph node data for each mirror node in the graph node group. In this specification, a first priority is the highest, a second priority is the second, and so on. A larger priority number indicates a lower priority.

In one example, each graph node group has a specified group size. Here, a group size of the graph node group can be represented by a quantity of nodes in the graph node group. For example, a group size of each graph node group can be 64 nodes. Group sizes of all graph node groups can be the same or different. In another example, a group size of each graph node group is configurable.

In this specification, the graph node dependency relationship is used to reflect dependency of the graph node relative to the mirror node during graph learning For example, when a graph node E needs to use graph node data of a mirror node B' during graph learning, the graph node E has a dependency relationship with the mirror node B'. In one example, the graph node dependency relationship can be generated in advance when graph partitioning is performed on graph node data of the distributed graph learning architecture. In another example, the graph node dependency relationship can also be generated when data access is performed.

Figures 5A, 5B:
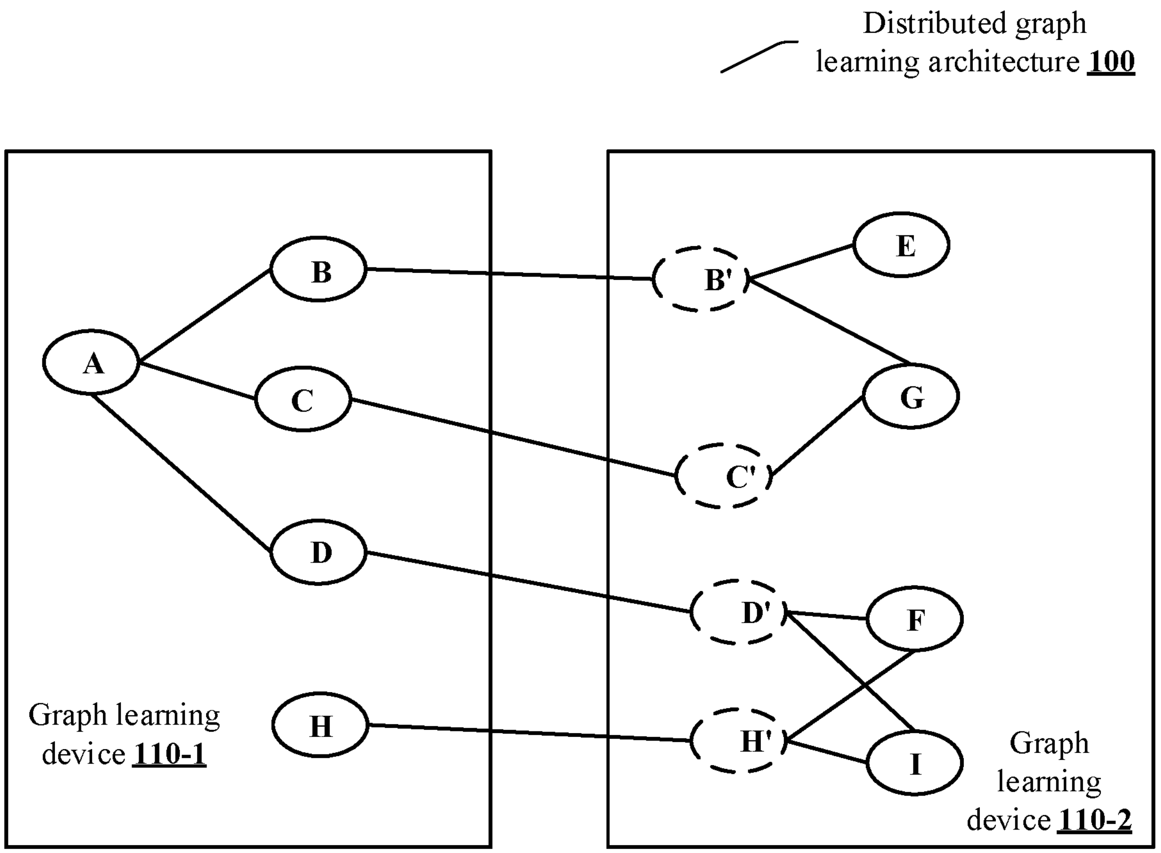
FIG. 5A and FIG. 5B are example schematic diagrams illustrating a graph node distribution and a corresponding graph node dependency table, according to an embodiment of this specification.

FIG. 5A is an example schematic diagram illustrating a graph node distribution, according to an embodiment of this specification. For a graph node distribution shown in FIG. 5A, a graph node E has a dependency relationship with a mirror node B', a graph node F has a dependency relationship with mirror nodes D' and H', a graph node G has a dependency relationship with mirror nodes B' and C', and a graph node I has a dependency relationship with mirror nodes D' and H'.

FIG. 5B is an example schematic diagram illustrating a graph node dependency relationship corresponding to the graph node distribution shown in FIG. 5A. In the example in FIG. 5B, the graph node dependency relationship is illustrated as a graph node dependency table, the first column of the graph node dependency table shows graph nodes A-I, and the first row shows mirror nodes B', C', D', and H'. A value "0" in the graph node dependency relationship indicates that no dependency relationship exists, and a value "1" indicates that a dependency relationship exists. In another embodiment, the graph node dependency relationship can also be represented in another proper representation form, for example, a graph node dependency relationship diagram.

In some embodiments, when graph node grouping is performed, graph nodes in the first graph learning device can be randomly grouped. Then, a node quantity of mirror nodes on which graph nodes included in each graph node group depend is counted based on the graph node dependency relationship, and a priority of each graph node group is determined based on the counted quantity of mirror nodes in each graph node group.

In some embodiments, when graph nodes are grouped, graph node ranking can performed on the graph node in the first graph learning device based on the graph node dependency relationship. Then, node grouping is performed on the graph node in the first graph learning device based on a graph node ranking result, to obtain a plurality of graph node groups with a priority. In this case, the priority of the graph node group can be determined based on node rankings of the graph nodes in the graph node group. A node ranking of any graph node in a graph node group with a higher priority is not lower than node rankings of all graph nodes in a graph node group with a lower priority.

Figure 6:
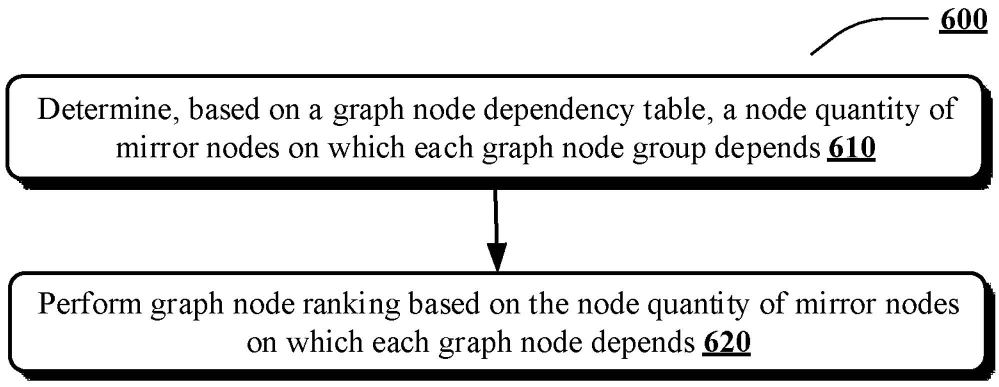
FIG. 6 is an example flowchart illustrating a graph node ranking process, according to an embodiment of this specification.

FIG. 6 is an example flowchart illustrating a graph node ranking process 600, according to an embodiment of this specification.

As shown in FIG. 6, in 610, a node quantity of mirror nodes on which each graph node in the first graph learning device depends is determined based on the graph node dependency relationship. For example, as shown in FIG. 5A, the first graph learning device is the graph learning device 110-2, a node quantity of mirror nodes on which the graph node E depends is 1, and a node quantity of mirror nodes on which the graph node F depends is 2.

In 620, the graph node in the first graph learning device is ranked based on the node quantity of mirror nodes on which each graph node depends. For example, in an example, graph node ranking can be performed in an ascending order of node quantities of mirror nodes on which the graph nodes depend. That is, a smaller node quantity of mirror nodes on which a graph node depends indicates a higher graph node ranking of the graph node. For example, for the graph nodes E and F, a mirror node on which the graph node E depends is B', and a mirror node on which the graph node F depends is D' and H', so that graph node E>graph node F. It should be noted that, graph nodes with the same node quantity of mirror nodes have the same ranking when graph node ranking is performed. For example, the graph nodes G, F, and I depend on the same node quantity (all quantities are 2) of mirror nodes, and the graph nodes G, F, and I are at the same ranking, that is, graph node G=graph node F=graph node I.

In some embodiments, when node grouping is performed on the graph node in the first graph learning device based on the graph node ranking result, graph nodes that depend on the same mirror node are grouped into the same graph node group as far as possible. In other words, if at least two graph nodes that depend on the same mirror node can be grouped into the same graph node group, the at least two graph nodes are grouped into the same graph node group. For example, in the example shown in FIG. 5A, the graph nodes F and I each depend on the mirror nodes D' and H', and the graph nodes F and I are grouped into the same graph node group, unless the graph node group is insufficient to accommodate both of the graph nodes F and I, and a group priority of a graph node that has been accommodated in the graph node group is higher than that of the graph nodes F and I.

In some embodiments, when node grouping is performed on the graph node in the first graph learning device based on the graph node ranking result, for graph nodes having the same ranking, a group priority of the graph node can be determined based on a quantity of mirror nodes that are in mirror nodes on which the graph node depends and that belong to a graph node group obtained through grouping. Then, node grouping is performed on the graph nodes with the same ranking based on the determined group priority of the graph node.

For example, in the example shown in FIG. 5A, the graph nodes G, F, and I each depend on two mirror nodes, and graph nodes G, F, and I have the same ranking. When node grouping is performed on the graph nodes G, F, and I, group priorities of the graph nodes are determined based on a quantity of mirror nodes that are in mirror nodes on which the graph nodes G, F, and I depend and that belong to a graph node group obtained through grouping. Specifically, in the two mirror nodes B' and C' on which the graph node G depends, one mirror node B' is a mirror node corresponding to a graph node (the graph node E) in a graph node group with a higher priority, and in the two mirror nodes D' and H' on which the graph nodes F and I depend, no mirror node corresponds to a graph node in the graph node group with a higher priority, and a group priority of the graph node G is higher than a group priority of the graph nodes F and I. During node grouping, the graph node G is preferentially grouped.

Back to FIG. 4, after node grouping is performed on the graph node in the first graph learning device, in 420, a mirror node on which each graph node group depends is determined based on the graph node dependency relationship. Specifically, for each graph node group, a mirror node on which each graph node in the graph node group depends is determined based on the graph node dependency relationship. Then, an obtained mirror node set is used as a mirror node on which the graph node group depends.

In 430, cache space is allocated, from a common buffer of the first graph learning device based on the priority of the graph node group, to a mirror node on which each graph node group depends. In some embodiments, cache space allocation can be performed graph node group by graph node group based on the priority of the graph node group. In some other embodiments, corresponding cache space can also be allocated to the graph node group in parallel based on the priority of the graph node group. For example, several graph node groups can be selected each time based on the priority of the graph node group, and then cache space is allocated to the graph node in the selected graph node group.

In this specification, a size of the common buffer of the first graph learning device is configurable. In an example, for the size of the common buffer, the common buffer needs to be capable of storing node data of a largest neighbor quantity of neighboring nodes of a master node in the distributed graph learning architecture. For example, in the distributed graph node architecture shown in FIG. 1, the graph node D has a largest quantity of neighboring nodes, and a quantity of neighboring nodes of the graph node D is 4. Therefore, the size of the common buffer needs to be capable of storing at least node data of the four graph nodes. Assuming that a data amount of node data of each graph node is fixed, the size of the common buffer can be represented by a quantity of graph nodes.

Figure 7:
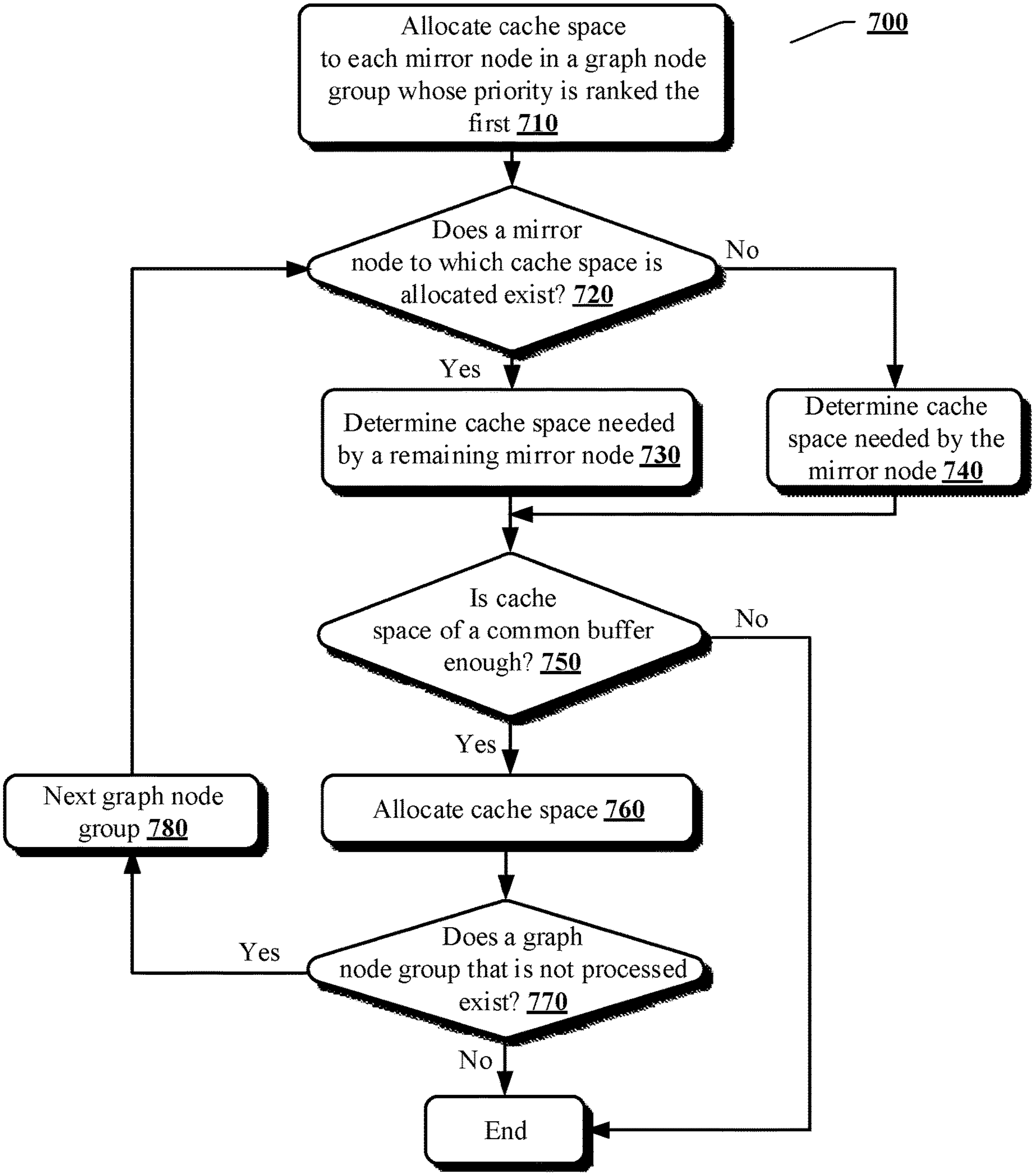
FIG. 7 is an example flowchart illustrating a cache space allocation process, according to an embodiment of this specification.

FIG. 7 is an example flowchart illustrating a cache space allocation process 700, according to an embodiment of this specification.

As shown in FIG. 7, in 710, for the graph node in the first graph learning device, cache space is allocated from the common buffer of the first graph learning device to each mirror node in a graph node group with a first priority. Then, starting from a graph node group with a second priority, operations 720 to 780 are cyclically performed, and each cycle process corresponds to a cache space allocation operation performed for one graph node group.

Specifically, in 720, whether a mirror node to which cache space is allocated exists in a mirror node on which a current graph node group depends. If a mirror node to which cache space is allocated exists, in 730, the mirror node to which cache space is allocated is removed from the mirror node on which the current graph node group depends, and cache space needed by the remaining mirror node is determined as cache space needed by the current graph node group. Then, 750 is performed. If a mirror node to which cache space is allocated does not exist, in 740, cache space needed by all mirror nodes on which the graph node group depends is determined as cache space needed by the current graph node group. Then, 750 is performed.

In 750, whether remaining cache space of the common buffer of the first graph learning device is not less than the cache space needed by the current graph node group is determined. If the remaining cache space of the common buffer is less than the cache space needed by the current graph node group, the cache space allocation process ends.

If the remaining cache space of the common buffer is not less than the cache space needed by the current graph node grouping, in 760, cache space is allocated to the mirror node on which the current graph node group depends. Specifically, when a mirror node to which cache space is allocated exists, cache space is allocated to the remaining mirror node in the current graph node group. When a mirror node to which cache space is allocated does not exist, cache space is allocated to all the mirror nodes on which the current graph node group depends.

In 770, whether a graph node group for which cache space allocation is not performed exists is determined. If a graph node group for which cache space allocation is not performed does not exist, the cache space allocation process ends.

If a graph node group for which cache space allocation is not performed exists, in 780, a graph node group with a highest priority is selected as a current graph node group of a next cycle process from the graph node group for which cache space allocation is not performed. Then, the process returns to 720, to perform the next cycle process.

It should be noted that, FIG. 7 shows only one implementation example of cache space. In another embodiment of this specification, various modifications can be made to the example shown in FIG. 7. For example, some steps in FIG. 7 can be removed or a step can be added to the example in FIG. 7.

Back to FIG. 4, in 40, for a graph node for which cache space allocation is completed, a data access process is initiated to a second graph learning device in which a corresponding graph node of the mirror node on which the graph node depends is located. In some embodiments, after cache space allocation is completed for each graph node or several graph nodes, a data access request can be initiated to a second graph learning device in which a corresponding graph node of a mirror node on which the graph node depends is located. The second graph learning device obtains corresponding graph node data in response to the data access request, and returns the obtained graph node data to the first graph learning device. In the data access process, data access is performed in a unit of a graph node. In some embodiments, for the graph node group for which cache space allocation is completed, a data access process can be initiated to a second graph learning device in which a corresponding graph node of a mirror node on which the graph node group depends is located. In the data access process, data access is performed in a unit of a graph node group.

Figure 8:
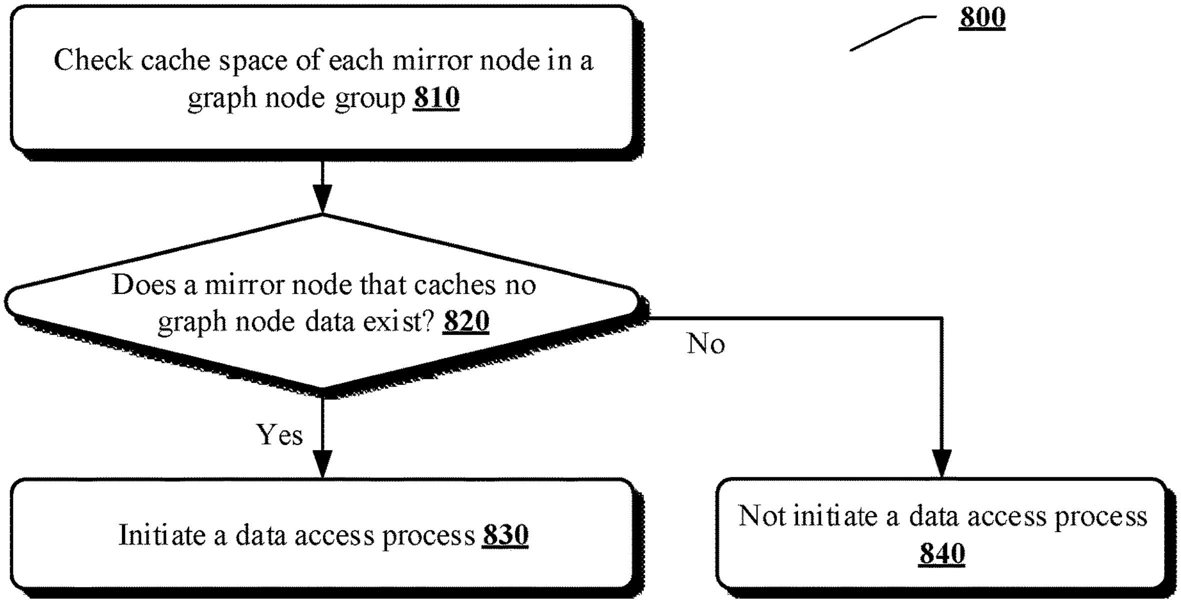
FIG. 8 is an example flowchart illustrating a data access process, according to an embodiment of this specification.

FIG. 8 is an example flowchart illustrating a data access process 800, according to an embodiment of this specification.

As shown in FIG. 8, in 810, for the graph node group for which cache space allocation is completed, cache space of each mirror node on which the graph node group depends is checked, and in 820, whether cache space of each mirror node caches graph node data is determined.

If there is a mirror node whose cache space caches no graph node data, in 830, the data access process is initiated to the second graph learning device in which the corresponding graph node of the mirror node is located. If there is no mirror node whose cache space caches no graph node data, in 840, the data access process is not initiated.

It should be noted that, FIG. 8 shows only an example embodiment of the data access process. In another embodiment, the embodiment shown in FIG. 8 can be modified. For example, a cache space check step and a corresponding processing step of the cache space check step is possibly not included, but the data access process is directly initiated.

Back to FIG. 4, after the graph node data is obtained from the second graph learning device in response to the data access process, in 450, the obtained graph node data of the mirror node is cached in the cache space allocated to the mirror node.

Once a graph node data obtaining process is completed for all the mirror nodes on which the graph node group depends, and graph node data of all the mirror nodes is cached in corresponding cache space, each graph node in the graph node group can execute a graph learning process based on graph node data of the graph node and graph node data of a mirror node on which the graph node depends.

In 460, the first graph learning device monitors whether a graph learning process of each graph node in the graph node group is completed. If it is not monitored that the graph learning process of each graph node in the graph node group is completed, monitoring continues.

If it is monitored that the graph learning process of each graph node in the graph node group is completed, in 470, whether a dependency-free mirror node exists in a mirror node on which the graph node group depends is determined based on the graph node dependency relationship. The dependency-free mirror node includes a mirror node on which a graph node group whose graph learning process is not completed does not depend. If it is determined that no dependency-free mirror node exists, 490 is performed.

If it is determined that a dependency-free mirror node exists, in 480, cache space allocated to the dependency-free mirror node is released. Then, 490 is performed.

In 490, whether there is a layer for which graph learning is not performed is determined. If there is a layer for which graph learning is not performed, 430 is performed again, to perform a next cycle process. If there is no layer for which graph learning is not performed, the procedure ends.

In some embodiments, in response to that the first graph learning device completes graph learning training of each graph node in the graph node group, cache space allocated to all the mirror nodes on which the graph node group depends can be directly released, and a dependency-free mirror node determining process in 470 does not need to be executed.

With reference to FIG. 1 to FIG. 8, the foregoing describes the data access method applied to the distributed graph learning architecture according to this embodiment of this specification. In the data access method, graph nodes are grouped into graph node groups with an access priority determined based on the graph node dependency relationship, and cache space is allocated to each graph node group from a specified common buffer based on the access priority. Only after cache space allocation is completed for a graph node, a data access process is initiated to another graph learning device. Stored mirror node data is cached in the allocated cache space for graph learning. In the data access method, a complete backup of master data does not need to be permanently stored in storage space of the graph learning device in which each mirror node is located, to improve utilization of storage space of the graph learning device.

In addition, in the data access method, at least two graph nodes that depend on the same mirror node are grouped into the same graph node group, so that a data access operation of the graph node group can provide mirror data needed by a graph learning process of the at least two graph nodes, thereby improving graph learning efficiency of a distributed graph learning architecture.

In addition, in the data access method, for graph nodes with the same ranking, a group priority of the graph node can be determined based on a quantity of mirror nodes that are in mirror nodes on which the graph node depends and that belong to a graph node group obtained through grouping, and node grouping is performed on the graph nodes with the same ranking based on the determined group priority of the graph node, so that accessed graph node data of the mirror node can be used, for graph learning earlier, by the graph node that depends on the mirror node, and cache space of the mirror data is released after graph learning is completed, thereby improving utilization of storage space of the first graph learning device.

According to the data access method, when the cache space is allocated to the mirror node on which the graph node group depends, whether a mirror node to which cache space is allocated exists in the mirror node on which the graph node group depends is checked, and only the cache space is allocated to the mirror node to which no cache space is allocated, thereby improving utilization of cache space of the common buffer of the first graph learning device.

According to the data access method, when the data access process is initiated to the second graph learning device, whether the cache space of the mirror node on which the graph node group depends caches graph node data is checked, and when the cache space caches node data, the data access process is not initiated for the mirror node, thereby improving data access efficiency of the mirror data.

According to the data access method, after the first graph learning device completes graph learning training of each graph node in the graph node group, the cache space allocated to all the mirror nodes on which the graph node group depends is released, so that the released cache space can be allocated to a mirror node in another graph node group, thereby improving utilization of cache space of the common buffer.

According to the data access method, after the first graph learning device completes graph learning training of each graph node in the graph node group, only cache space allocated to a dependency-free mirror node in all the mirror nodes on which the graph node group depends is released, so that when graph learning is performed for another graph node group for which graph learning is not completed, mirror data of a mirror node on which the graph node group depends can be obtained from the cache space, without a need to initiate a data access process to the second graph learning device again, and the cache space of the dependency-free mirror node is released, to allocate the cache space to the mirror node in another graph node group, thereby improving utilization of the cache space of the common buffer.

Figure 9:
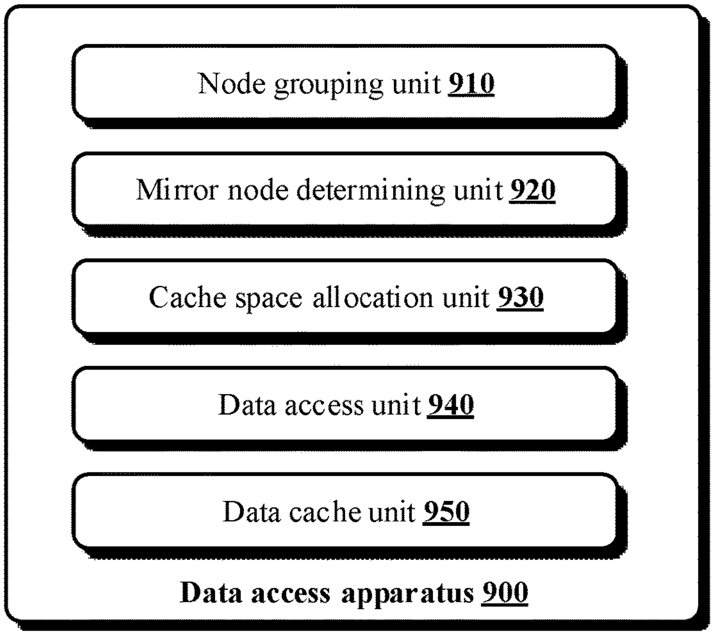
FIG. 9 is an example block diagram illustrating a data access apparatus applied to a distributed graph learning architecture, according to an embodiment of this specification.

FIG. 9 is an example block diagram illustrating a data access apparatus 900 applied to a distributed graph learning architecture, according to an embodiment of this specification. The data access apparatus 900 is applied to a first graph learning device with a mirror node in a distributed graph learning architecture. As shown in FIG. 9, the data access apparatus 900 includes a node grouping unit 910, a mirror node determining unit 920, a cache space allocation unit 930, a data access unit 940, and a data cache unit 950.

The node grouping unit 910 is configured to perform node grouping on a graph node in the first graph learning device, to obtain a plurality of graph node groups with a priority. A priority of the graph node group is determined based on a graph node dependency relationship. For an operation of the node grouping unit 910, references can be made to the operation described above with reference to 410 in FIG. 4. The mirror node determining unit 920 is configured to determine, based on the graph node dependency relationship, a mirror node on which each graph node group depends. For an operation of the mirror node determining unit 920, references can be made to the operation described above with reference to 420 in FIG. 4.

The cache space allocation unit 930 is configured to allocate, from a common buffer of the first graph learning device based on the priority of the graph node group, cache space to the mirror node on which each graph node group depends. For an operation of the cache space allocation unit 930, references can be made to the operation described above with reference to 430 in FIG. 4.

The data access unit 940 is configured to initiate, for a graph node for which cache space allocation is completed, a data access process to a second graph learning device in which a corresponding graph node of the mirror node on which the graph node depends is located. For an operation of the data access unit 940, references can be made to the operation described above with reference to 440 in FIG. 4. The data cache unit 950 is configured to cache, in the allocated cache space, graph node data returned in response to the data access process. For an operation of the data cache unit 950, references can be made to the operation described above with reference to the 450 in FIG. 4.

In one example, the graph node dependency relationship can be generated in advance when graph partitioning is performed on graph node data of the distributed graph learning architecture. Correspondingly, the data access apparatus 900 can further include a dependency relationship storage unit (not shown). The dependency relationship storage unit is configured to store a graph node dependency relationship generated when graph partitioning is performed on graph node data of the distributed graph learning architecture.

In an example, when node grouping is performed on the graph node in the first graph learning device, if at least two graph nodes that depend on the same mirror node can be grouped into the same graph node group, the node grouping unit 910 groups the at least two graph nodes into the same graph node group.

In an example, the data access apparatus 900 can further include a graph node ranking unit (not shown). The graph node ranking unit is configured to rank the graph node in the first graph learning device based on the graph node dependency relationship. Then, the node grouping unit 910 performs node grouping on the graph node in the first graph learning device based on a graph node ranking result.

Figure 10:
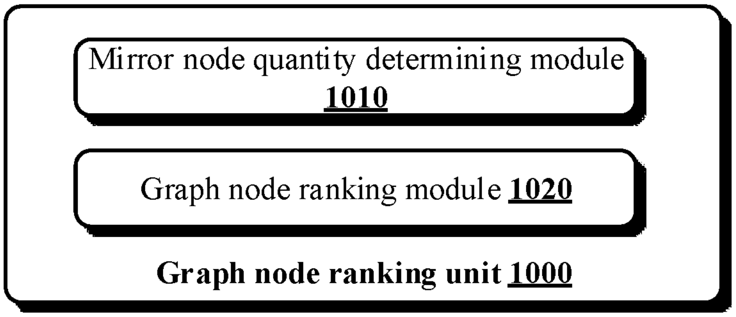
FIG. 10 is an example block diagram illustrating a graph node ranking unit, according to an embodiment of this specification.

FIG. 10 is an example block diagram illustrating a graph node ranking unit 1000, according to an embodiment of this specification. As shown in FIG. 10, the graph node ranking unit 1000 includes a mirror node quantity determining module 1010 and a graph node ranking module 1020.

The mirror node quantity determining module 1010 is configured to determine, based on the graph node dependency relationship, a node quantity of mirror nodes on which each graph node in the first graph learning device depends. For an operation of the mirror node quantity determining module 1010, references can be made to the operation described above with reference to 610 in FIG. 6.

The graph node ranking module 1020 is configured to rank the graph node in the first graph learning device based on the node quantity of mirror nodes on which each graph node depends. For an operation of the graph node ranking module 1020, references can be made to the operation described above with reference to 620 in FIG. 6.

In one example, during graph node ranking, graph nodes that have the same node quantity of mirror nodes have the same ranking. Correspondingly, when node grouping is performed on the graph node in the first graph learning device based on the graph node ranking result, for graph nodes having the same ranking, the node grouping unit 910 determines a group priority of the graph node based on a quantity of mirror nodes that are in mirror nodes on which the graph node depends and that belong to a graph node group obtained through grouping, and performs node grouping based on the group priority of the graph node.

Figure 11:
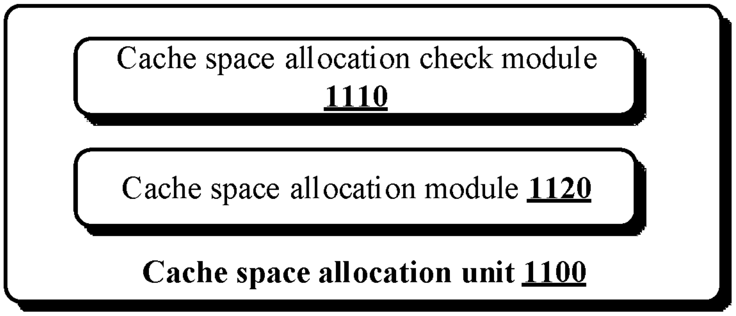
FIG. 11 is an example block diagram illustrating a cache space allocation unit, according to an embodiment of this specification.

FIG. 11 is an example block diagram illustrating a cache space allocation unit 1100, according to an embodiment of this specification. As shown in FIG. 11, the cache space allocation unit 1100 can include a cache space allocation check module 1110 and a cache space allocation module 1120. The cache space allocation check module 1110 is configured to: for each graph node group, check whether cache space is allocated to a mirror node on which the graph node group depends. The cache space allocation module 1120 is configured to: for a mirror node to which no cache space is allocated, allocate cache space to the mirror node from the common buffer of the first graph learning device.

The cache space allocation unit 1100 can further include a cache needed space determining module (not shown) and a cache determining module (not shown). The cache needed space determining module is configured to determine, based on a check result of the cache space allocation check module 1110, cache space needed by the graph node group. Specifically, when the check result of the cache space allocation check module 1110 indicates that there is a mirror node to which cache space is allocated, the cache needed space determining module removes, from the mirror node on which the graph node group depends, the mirror node to which cache space is allocated, and determines, as the cache space needed by the graph node group, cache space needed by a remaining mirror node. When the check result of the cache space allocation check module 1110 indicates that no mirror node to which cache space is allocated exists, the cache needed space determining module determines, as the cache space needed by the graph node group, the cache space needed by all the mirror nodes to which the graph node group depends.

The cache determining module is configured to determine, based on remaining cache space of the common buffer and the cache space needed by the graph node group, whether cache space can be allocated to the graph node group. When the remaining cache space of the common buffer is not less than the cache space needed by the graph node group, the cache determining module determines that cache space can be allocated to the graph node group. When the remaining cache space of the common buffer is less than the cache space needed by the graph node group, the cache determining module determines that cache space cannot be allocated to the graph node group. The cache space allocation module 1120 is configured to: when the cache determining module determines that cache space can be allocated to the graph node group, allocate cache space from the common buffer of the first graph learning device to a mirror node on which the graph node group depends and to which no cache space is allocated.

Figure 12:
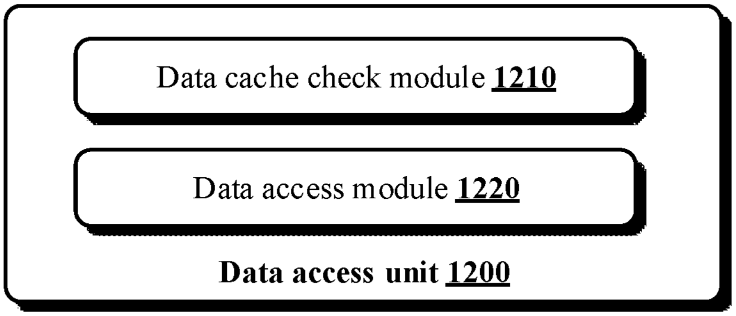
FIG. 12 is an example block diagram illustrating a data access unit, according to an embodiment of this specification.

FIG. 12 is an example block diagram illustrating a data access unit 1200, according to an embodiment of this specification. As shown in FIG. 12, the data access unit 1200 can include a data cache check module 1210 and a data access module 1220.

The data cache check module 1210 is configured to: for a graph node group for which cache space allocation is completed, check whether cache space of each mirror node on which the graph node group depends caches graph node data. For an operation of the data cache check module 1210, references can be made to the operation described above with reference to 810 in FIG. 8.

The data access module 1220 is configured to: for a mirror node that caches no graph node data, initiate a data access process to a second graph learning device in which a corresponding graph node of the mirror node is located. For an operation of the data access module 1220, references can be made to the operation described above with reference to 830 in FIG. 8.

In addition, optionally, in an example, the data access apparatus 900 can further include a cache space releasing unit (not shown). In response to that the first graph learning device completes graph learning training of each graph node in a graph node group, the cache space releasing unit releases cache space allocated to all mirror nodes on which the graph node group depends.

In addition, optionally, in an example, the data access apparatus 900 can further include a dependency-free mirror node check unit (not shown) and a cache space releasing unit (not shown). The dependency-free mirror node check unit is configured to: in response to that the first graph learning device completes graph learning training of each graph node in a graph node group, determine, based on the graph node dependency relationship, whether a dependency-free mirror node exists in a mirror node on which the graph node group depends. The dependency-free mirror node includes a mirror node on which a graph node group whose graph learning process is not completed does not depend. The cache space releasing unit is configured to: when a dependency-free mirror node exists in the mirror node on which the graph node group depends, release cache space allocated to the dependency-free mirror node.

Referring to FIG. 1 to FIG. 12, the data access method and the data access apparatus that are applied to the distributed graph learning architecture in the embodiments of this specification are described. The data access apparatus can be implemented by using hardware, or can be implemented by using software or a combination of hardware and software.

Figure 13:
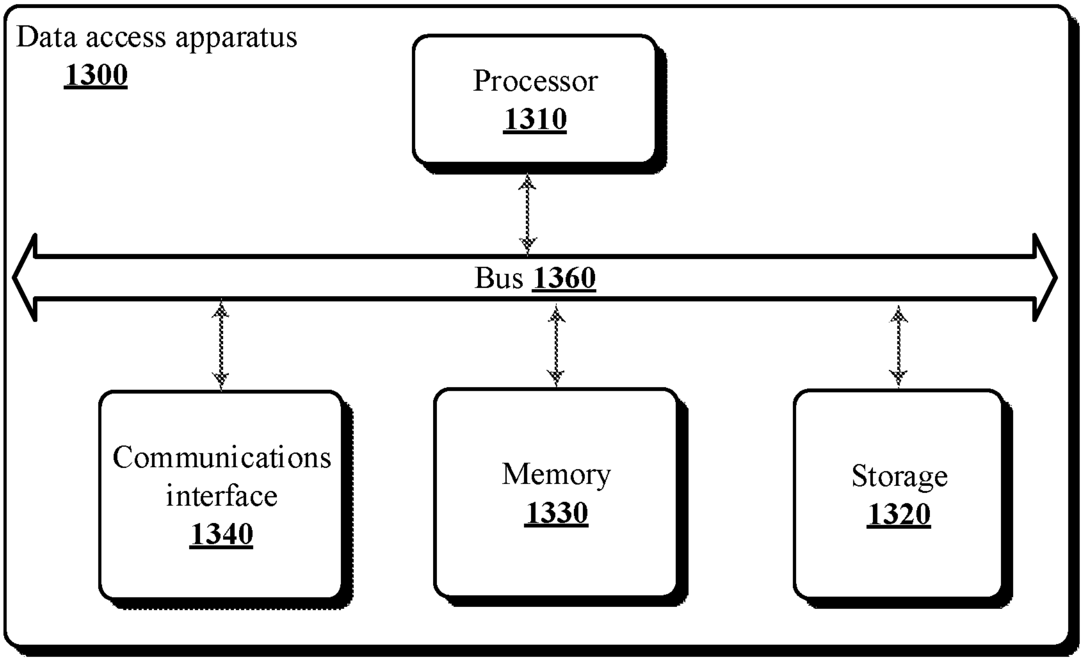
FIG. 13 is an example schematic diagram illustrating a data access apparatus that is applied to a distributed graph learning architecture and that is implemented based on a computer system, according to an embodiment of this specification.

FIG. 13 is a schematic diagram illustrating a data access apparatus 1300 that is applied to a distributed graph learning architecture and that is implemented based on a computer system, according to an embodiment of this specification. As shown in FIG. 13, the data access apparatus 1300 can include at least one processor 1310, a storage (for example, a non-volatile memory) 1320, a memory 1330, and a communication interface 1340, and the at least one processor 1310, the storage 1320, the memory 1330, and the communication interface 1340 are connected together by using a bus 1360. The at least one processor 1310 executes at least one computer-readable instruction (namely, the above-mentioned elements implemented in a software form) stored or encoded in the storage.

In an embodiment, the storage stores computer-executable instructions, and when the computer-executable instructions are executed, the at least one processor 1310 is enabled to perform the following operations: performing node grouping on a graph node in the first graph learning device, to obtain a plurality of graph node groups with a priority, where a priority of the graph node group is determined based on a graph node dependency relationship, and the graph node dependency relationship is used to reflect dependency of the graph node relative to the mirror node during graph learning; determining, based on the graph node dependency relationship, a mirror node on which each graph node group depends; allocating, from a common buffer of the first graph learning device based on the priority of the graph node group, cache space to the mirror node on which each graph node group depends; initiating, for a graph node for which cache space allocation is completed, a data access process to a second graph learning device in which a corresponding graph node of the mirror node on which the graph node depends is located; and caching, in the allocated cache space, graph node data returned in response to the data access process.

It should be understood that, when the computer-executable instructions stored in the storage are executed, the at least one processor 1310 is enabled to perform the above-mentioned operations and functions described with reference to FIG. 1 to FIG. 12 in the embodiments of this specification.

According to an embodiment, a program product such as a machine-readable medium (for example, a non-temporary machine-readable medium) is provided. The machine-readable medium can have instructions (that is, the above-mentioned elements implemented in a software form). When the instructions are executed by a machine, the machine is enabled to perform the above-mentioned operations and functions described with reference to FIG. 1 to FIG. 12 in the embodiments of this specification. Specifically, a system or an apparatus provided with a readable storage medium can be provided, and software program code for implementing the functions in any of the above-mentioned embodiments is stored in the readable storage medium, so that a computer or a processor of the system or the apparatus reads and executes instructions stored in the readable storage medium.

In this case, the program code read from the readable medium can implement the functions in any one of the above-mentioned embodiments, and therefore, the machine-readable code and the readable storage medium storing the machine-readable code form a part of the present invention.

Embodiments of the readable storage medium include a floppy disk, a hard disk, a magneto-optical disk, an optical disc (for example, a CD-ROM, a CD-R, a CD-RW, a DVD-ROM, a DVD-RAM, a DVD-RW, a DVD-RW), a magnetic tape, a non-volatile memory card, and a ROM. Alternatively, the program code can be downloaded from a server computer or a cloud by a communication network.

According to an embodiment, a computer program product is provided. The computer program product includes a computer program, and when the computer program is executed by a processor, the processor is enabled to perform the above-mentioned operations and functions described with reference to FIG. 1 to FIG. 12 in the embodiments of this specification.

A person skilled in the art should understand that various variations and modifications can be made to the embodiments disclosed above without departing from the essence of the present invention. Therefore, the protection scope of this disclosure shall be subject to the appended claims.

It should be noted that, not all steps and units in the previous processes and system structure diagrams are necessary. Some steps or units can be ignored based on actual requirements. An execution sequence of each step is not fixed, and can be determined based on needs. The apparatus structure described in the above-mentioned embodiments can be a physical structure, or can be a logical structure. In other words, some units can be implemented by the same physical entity, or some units can be implemented by multiple physical entities or implemented jointly by some components in a plurality of independent devices.

In the above-mentioned embodiments, the hardware unit or module can be implemented in a mechanical manner or an electrical manner. For example, a hardware unit, a module, or a processor can include a dedicated permanent circuit or logic (for example, a dedicated processor, an FPGA, or an ASIC) to complete a corresponding operation. The hardware unit or the processor can further include programmable logic or circuits (for example, a general-purpose processor or another programmable processor), and can be temporarily disposed by the software, to complete a corresponding operation. A specific implementation (a mechanical manner, a dedicated permanent circuit, or a temporarily disposed circuit) can be determined in consideration of costs and time.

The specific implementations described above with reference to the accompanying drawings describe example embodiments, but do not represent all embodiments that can be implemented or fall within the protection scope of the claims. The term "example" used throughout this specification means "used as an example, an instance, or an illustration" and does not mean "preferred" or "advantageous" over other embodiments. For the purpose of providing an understanding of the described technology, a specific implementation includes specific details. However, these technologies can be implemented without these specific details. In some instances, to avoid obscuring the described concepts in the embodiments, well-known structures and apparatuses are shown in the form of a block diagram.

The above-mentioned descriptions of content of this disclosure are provided to enable any person of ordinary skill in the art to implement or use the content of this disclosure. It is obvious to a person of ordinary skill in the art that various modifications can be made to the content of this disclosure. In addition, the general principle defined in this specification can be applied to another variant without departing from the protection scope of the content of this disclosure. Therefore, the content of this disclosure is not limited to the examples and designs described in this specification, but is consistent with the widest range of principles and novelty features that conform to this specification.

What is claimed is:

1. A data access method applied to a distributed graph learning architecture, wherein the data access method is performed by a first graph learning device that has a mirror node in the distributed graph learning architecture, and the data access method comprises:

performing node grouping on a graph node in the first graph learning device, to obtain a plurality of graph node groups each with a priority, wherein the priority of the graph node group is determined based on a graph node dependency relationship, and the graph node dependency relationship is used to reflect dependency of the graph node relative to the mirror node during graph learning;

determining, based on the graph node dependency relationship, the mirror node on which each graph node group depends;

allocating, from a common buffer of the first graph learning device based on the priority of the graph node group, cache space to the mirror node on which each graph node group depends;

initiating, for a graph node for which cache space allocation is completed, a data access process to a second graph learning device in which a corresponding graph node of the mirror node on which the graph node depends is located; and caching, in the allocated cache space, graph node data returned in response to the data access process.

2. The data access method according to claim 1, wherein the performing node grouping on a graph node in the first graph learning device, to obtain a plurality of graph node groups each with a priority comprises:

ranking the graph node in the first graph learning device based on the graph node dependency relationship; and performing node grouping on the graph node in the first graph learning device based on a graph node ranking result, to obtain the plurality of graph node groups each with a priority.

3. The data access method according to claim 1, wherein the initiating, for a graph node for which cache space allocation is completed, a data access process to a second graph learning device in which a corresponding graph node of the mirror node on which the graph node depends is located comprises:

initiating, for a graph node group for which cache space allocation is completed, a data access process to a second graph learning device in which a corresponding graph node of a mirror node on which the graph node group depends is located.

4. The data access method according to claim 1, wherein the graph node dependency relationship is generated when graph partitioning is performed on graph node data of the distributed graph learning architecture.

5. The data access method according to claim 2, wherein each graph node group has a configurable group size.

6. The data access method according to claim 5, wherein when node grouping is performed on the graph node in the first graph learning device based on the graph node ranking result, upon determining that at least two graph nodes that depend on the same mirror node is capable of being grouped into the same graph node group, the at least two graph nodes are grouped into the same graph node group.

7. The data access method according to claim 2, wherein the ranking the graph node in the first graph learning device based on the graph node dependency relationship comprises:

determining, based on the graph node dependency relationship, a node quantity of mirror nodes on which each graph node in the first graph learning device depends; and ranking the graph node in the first graph learning device based on the node quantity of mirror nodes on which each graph node depends.

8. The data access method according to claim 7, wherein graph nodes that have the same node quantity of mirror nodes have the same ranking; and when node grouping is performed on the graph node in the first graph learning device based on the graph node ranking result, for graph nodes having the same ranking, determining a group priority of the graph node based on a quantity of mirror nodes that are in mirror nodes on which the graph node depends and that belong to a graph node group obtained through grouping.

9. The data access method according to claim 1, wherein the allocating, from a common buffer of the first graph learning device based on the priority of the graph node group, cache space to the mirror node on which each graph node group depends comprises:

for each graph node group, checking whether cache space is allocated to a mirror node on which the graph node group depends; and for a mirror node to which no cache space is allocated, allocating cache space to the mirror node from the common buffer of the first graph learning device.

10. The data access method according to claim 3, wherein the initiating, for a graph node group for which cache space allocation is completed, a data access process to a second graph learning device in which a corresponding graph node of a mirror node on which the graph node group depends is located comprises:

for a graph node group for which cache space allocation is completed, checking whether cache space of each mirror node on which the graph node group depends caches graph node data; and for a mirror node that caches no graph node data, initiating a data access process to a second graph learning device in which a corresponding graph node of the mirror node is located.

11. The data access method according to claim 3, further comprising:

in response to that the first graph learning device completes graph learning training of each graph node in a graph node group, releasing cache space allocated to all mirror nodes on which the graph node group depends.

12. The data access method according to claim 3, further comprising:

in response to that the first graph learning device completes graph learning training of each graph node in a graph node group, determining, based on the graph node dependency relationship, whether a dependency-free mirror node exists in a mirror node on which the graph node group depends, wherein the dependency-free mirror node comprises a mirror node on which a graph node group whose graph learning process is not completed does not depend; and when a dependency-free mirror node exists in the mirror node on which the graph node group depends, releasing cache space allocated to the dependency-free mirror node.

13. The data access method according to claim 1, wherein a graph learning process of the distributed graph learning architecture is a hierarchical iterative learning process, and a cache space allocation step of the mirror node, an initiation step of the data access process, and a caching step of the graph node data are cyclically performed until the hierarchical iterative learning process is completed.

14. A data access device applied to a distributed graph learning architecture, comprising:

a memory and a processor, wherein the memory stores executable instructions that, in response to execution by the processor, cause the processor to:

perform node grouping on a graph node in the first graph learning device, to obtain a plurality of graph node groups each with a priority, wherein the priority of the graph node group is determined based on a graph node dependency relationship, and the graph node dependency relationship is used to reflect dependency of the graph node relative to a mirror node during graph learning;

determine, based on the graph node dependency relationship, the mirror node on which each graph node group depends;

allocate, from a common buffer of the first graph learning device based on the priority of the graph node group, cache space to the mirror node on which each graph node group depends;

initiate, for a graph node for which cache space allocation is completed, a data access process to a second graph learning device in which a corresponding graph node of the mirror node on which the graph node depends is located; and cache, in the allocated cache space, graph node data returned in response to the data access process.

15. A non-transitory computer-readable storage medium, comprising instructions stored therein that, when executed by a processor of a computing device, cause the processor to:

perform node grouping on a graph node in the first graph learning device, to obtain a plurality of graph node groups each with a priority, wherein the priority of the graph node group is determined based on a graph node dependency relationship, and the graph node dependency relationship is used to reflect dependency of the graph node relative to a mirror node during graph learning;

determine, based on the graph node dependency relationship, the mirror node on which each graph node group depends;

allocate, from a common buffer of the first graph learning device based on the priority of the graph node group, cache space to the mirror node on which each graph node group depends;

initiate, for a graph node for which cache space allocation is completed, a data access process to a second graph learning device in which a corresponding graph node of the mirror node on which the graph node depends is located; and cache, in the allocated cache space, graph node data returned in response to the data access process.

* * * * *